(12) United States Patent
Kulkarni et al.

(10) Patent No.: US 10,683,236 B2
(45) Date of Patent: *Jun. 16, 2020

(54) GLASS CERAMIC COMPOSITE ELECTROLYTE FOR LOW TEMPERATURE SOLID OXIDE FUEL CELL

(71) Applicants: DIRECTOR GENERAL, CENTRE FOR MATERIALS FOR ELECTRONICS TECHNOLOGY, Pune, Maharashtra (IN); SECRETARY, DEPARTMENT OF ELECTRONICS AND INFORMATION TECHNOLOGY [DEITY], New Delhi (IN)

(72) Inventors: Shrikant Kulkarni, Maharashtra (IN); Siddhartha Duttagupta, Maharashtra (IN); Vijaya Giramkar, Maharashtra (IN); Girish Phatak, Maharashtra (IN)

(73) Assignees: Director General, Centre for Materials for Electronics Technology, Pune, Maharashtra (IN); Secretary, Department of Electronics and Information Technology (DEITY), New Delhi (IN)

( * ) Notice: Subject to any disclaimer, the term of this patent is extended or adjusted under 35 U.S.C. 154(b) by 157 days.

This patent is subject to a terminal disclaimer.

(21) Appl. No.: 15/542,212

(22) PCT Filed: Jan. 7, 2016

(86) PCT No.: PCT/IB2016/050055
§ 371 (c)(1),
(2) Date: Jul. 7, 2017

(87) PCT Pub. No.: WO2016/110810
PCT Pub. Date: Jul. 14, 2016

(65) Prior Publication Data
US 2017/0355643 A1 Dec. 14, 2017

(30) Foreign Application Priority Data
Jan. 7, 2015 (IN) .............................. 57/MUM/2015

(51) Int. Cl.
*C04B 35/50* (2006.01)
*C03C 3/12* (2006.01)
*C03C 3/21* (2006.01)
*C03C 8/08* (2006.01)
*C03C 8/00* (2006.01)
*C03C 14/00* (2006.01)
*H01M 8/1246* (2016.01)
*C04B 35/626* (2006.01)
*H01M 8/124* (2016.01)

(52) U.S. Cl.
CPC .............. *C04B 35/50* (2013.01); *C03C 3/122* (2013.01); *C03C 3/21* (2013.01); *C03C 8/00* (2013.01); *C03C 8/08* (2013.01); *C03C 14/006* (2013.01); *C04B 35/62625* (2013.01); *C04B 35/62675* (2013.01); *C04B 35/62685* (2013.01); *C04B 35/62695* (2013.01); *H01M 8/1246* (2013.01); *C04B 2235/3201* (2013.01); *C04B 2235/3224* (2013.01); *C04B 2235/3229* (2013.01); *C04B 2235/3239* (2013.01); *C04B 2235/3298* (2013.01); *C04B 2235/34* (2013.01); *C04B 2235/36* (2013.01); *C04B 2235/443* (2013.01); *C04B 2235/6562* (2013.01); *C04B 2235/6567* (2013.01); *H01M 2008/1293* (2013.01); *Y02E 60/525* (2013.01); *Y02P 70/56* (2015.11)

(58) Field of Classification Search
None
See application file for complete search history.

(56) References Cited

U.S. PATENT DOCUMENTS

| | | | |
|---|---|---|---|
| 2011/0236794 A1* | 9/2011 | Donet | H01M 4/8621 429/495 |
| 2012/0231366 A1 | 9/2012 | Wachsman et al. | |
| 2013/0026409 A1 | 1/2013 | Baker et al. | |

FOREIGN PATENT DOCUMENTS

| | | |
|---|---|---|
| KR | 20110083371 A | 7/2011 |
| WO | 2012/138403 A1 | 10/2012 |

OTHER PUBLICATIONS

International Search Report of PCT/IB2016/050055, dated Apr. 6, 2016.

* cited by examiner

*Primary Examiner* — Sin J Lee
(74) *Attorney, Agent, or Firm* — Collard & Roe, P.C.

(57) ABSTRACT

The present disclosure provides a glass ceramic composite electrolyte comprising gadolinium doped ceria and glass composite with desired ionic conductivity in the temperature range of 400 to 600° C., suitable for applications in solid oxide fuel cells. Also disclosed is a process for the preparation of the glass ceramic composite electrolyte.

10 Claims, 4 Drawing Sheets

GLASS CERAMIC COMPOSITE ELECTROLYTE FOR LOW TEMPERATURE SOLID OXIDE FUEL CELL

CROSS REFERENCE TO RELATED APPLICATIONS

This application is the National Stage of PCT/IB2016/050055 filed on Jan. 7, 2016, which claims priority under 35 U.S.C. § 119 of Indian Application No. 57/MUM/2015 filed on Jan. 7, 2015, the disclosures of which are incorporated by reference. The international application under PCT article 21(2) was published in English.

FIELD

The present disclosure relates to a glass ceramic composite electrolyte. Particularly, the present disclosure relates to a glass ceramic composite electrolyte for solid oxide fuel cells and a process for preparing the same.

Definition

As used in the present disclosure, the following word/phrase is generally intended to have the meaning as set forth below, except to the extent that the context in which it is used indicates otherwise.

Ramp rate: The term "ramp rate" refers to the rate of increase in furnace temperature with respect to time, in minutes, to reach peak firing temperature.

BACKGROUND

Solid oxide fuel cells (SOFCs) can generate power in the range of 1-100 kW power with an efficiency of 60-70%. SOFCs can be operated using different fuels like alcohol, hydrocarbons ammonia and gases like methane. Thus, fuel flexibility is one of the important advantages of SOFCs over other fuel cells.

The SOFCs are currently operated in the temperature range of 800-1000° C., restricting their application in stationary power generators. The operating temperature of SOFCs must be reduced to the range of 400-600° C. to extend the use of SOFCs to automobile and other applications. Ionic conducting electrolytes can be utilized to reduce the operating temperature range of SOFCs. Yttrium stabilized zirconia (YSZ) has an oxygen conductivity of 0.1 S/cm above 800° C. Doped ceria, lanthanum gallate and lanthanum manganite based electrolytes have ionic conductivity comparable to YSZ in the operating temperature range of 700-800° C.

Further, electrolytes doped with carbonate salts like sodium carbonate, potassium carbonate, barium carbonate and strontium carbonate either alone or in combination have low ionic conductivity in the temperature range of 400-600° C. However, these carbonate doped electrolytes are chemically unstable and are less durable than ceramic electrolytes. Also, the higher operating temperatures of SOFCs create problems in sealing of the SOFCs.

Therefore, there is felt a need to provide a stable electrolyte which can provide better ionic conductivity at a lower temperature.

OBJECTS

Some of the objects of the present disclosure, which at least one embodiment herein satisfies, are as follows:

An object of the present disclosure is to provide a stable glass ceramic composite electrolyte which exhibits enhanced ionic conductivity.

Another object of the present disclosure is to provide a glass ceramic composite electrolyte which provides desired conductivity at a temperature less than 800° C.

Still another object of the present disclosure is to provide a process for preparing a glass ceramic composite electrolyte.

Yet another object of the present disclosure is to provide a solid oxide fuel cell containing the glass ceramic composite electrolyte.

Other objects and advantages of the present disclosure will be more apparent from the following description when read in conjunction with the accompanying figures, which are not intended to limit the scope of the present disclosure.

SUMMARY

In accordance with the present disclosure there is provided a glass ceramic composite electrolyte comprising: gadolinium doped ceria; and a glass composite. The glass comprises 60 to 99 wt % bismuth oxide; 0 to 15 wt % vanadium oxide; 0 to 15 wt % phosphorus pentoxide; and 1 to 40 wt % potassium oxide. In one embodiment, the glass consists of 90 wt % bismuth oxide and 10 wt % potassium oxide. The glass ceramic composite electrolyte comprises a homogenized mixture of ground gadolinium doped ceria and fine grounded glass powder, wherein the proportion of glass in the glass ceramic composite electrolyte varies between 10 and 40 wt %. The ionic conductivity of glass ceramic composite electrolyte in the temperature range of 400-600° C. ranges between $2.25 \times 10^{-5}$ and $3.53 \times 10^{-2}$ S/cm.

In accordance with another aspect of the present disclosure there is provided a process for the preparation of the glass ceramic composite electrolyte comprising the following steps: cerium nitrate is mixed with gadolinium nitrate to obtain a first mixture, glycine is added to the first mixture, the solution obtained is stirred and heated to obtain a gel, which is further combusted to obtain a powdered mass and then sintered to obtain gadolinium doped ceria. Next, bismuth oxide and potassium oxide; and optionally vanadium oxide and phosphorus pentoxide, are mixed to obtain a second mixture, acetone is added to the mixture, then the mixture is milled and dried to obtain a dried mass which is calcined to obtain a molten mass and further, the molten mass is quenched to obtain glass frit and milled to obtain glass powder. The gadolinium doped ceria and glass powder is then grinded to obtain a third mixture, polyvinyl alcohol is added to the third mixture to obtain a homogenized mass and then subjected to pelletization. The pellets obtained are sintered to obtain the glass ceramic composite electrolyte of the present disclosure.

BRIEF DESCRIPTION OF THE ACCOMPANYING DRAWING

A glass ceramic composite electrolyte for low temperature solid oxide fuel cells in accordance with the present disclosure will now be explained in relation to the accompanying drawing, in which.

DETAILED DESCRIPTION

Figure 1:
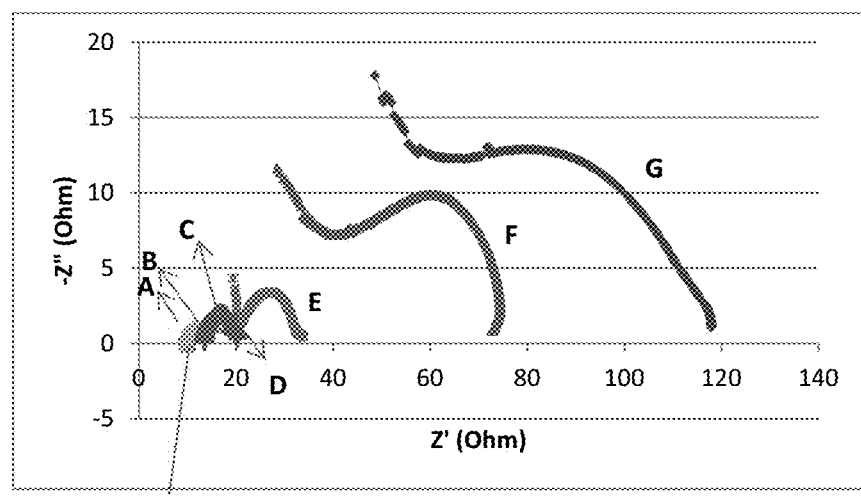
FIG. 1 illustrates the Frequency Response Analysis (FRA) curves of the various weight % of glass added in $Gd_{0.2}Ce_{0.8}O_{1.85}$ (gadolinium doped ceria)
Figure 1:
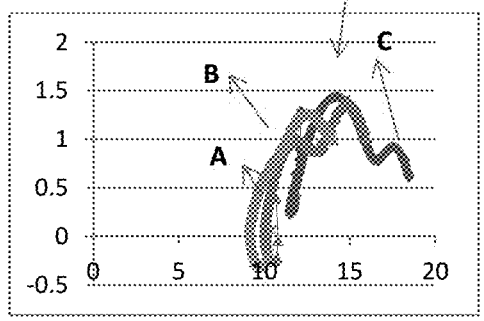

It is known that sealing of SOFCs is tedious in the operating temperature range of 800 to 1000° C. Further, the problem is extended over interconnects and gasket material at such a high operating temperature.

The present disclosure provides a glass ceramic composite electrolyte which can reduce the operating temperature of SOFCs. The low operating temperatures of SOFCs provide flexibility in designing and sealing of SOFCs. Further, the reduction in operating temperature increases the possibility of integration of SOFCs to automobile and handled devices.

Furthermore, the present disclosure focuses on reducing the sintering temperature for desiccation of the electrolyte from 1200° C. to 800-1000° C.

Accordingly, the present disclosure provides novel glass ceramic electrolyte materials which are advanced over the known classical ceramic electrolyte and carbonate doped ceramic electrolyte in terms of ionic conductivity and stability.

In accordance with the present disclosure the glasses and ceramic materials are selected on the basis of their chemical and physical compatibilities with each other and other fuel cell components.

The glass ceramic composite electrolyte comprises gadolinium doped ceria and a glass composite.

In an embodiment of the present disclosure, the glass comprises 60 to 99 wt % bismuth oxide, 0 to 15 wt % vanadium oxide, 0 to 15 wt % phosphorus pentoxide and 1 to 40 wt % potassium oxide.

In another embodiment, the glass consists of 90 wt % bismuth oxide and 10 wt % potassium oxide.

The glass ceramic composite electrolyte comprises a homogenized mixture of ground gadolinium doped ceria and ground glass composite powder, wherein the proportion of glass composite in the glass ceramic composite electrolyte varies between 10 and 40 wt %. The ratio of the gadolinium doped ceria to glass composite can be 60:40.

In accordance with the present disclosure the doping of low temperature glass in gadolinium doped ceria is in such a way that the glass will act as sintering aid and will help in boosting ionic conductivity at lower operating temperature. In accordance with the present disclosure it is ensured that the addition of the low temperature melting glass is chemically stable with gadolinium doped ceria (GDC), hydrogen and oxygen at elevated temperature and increases oxygen vacancies in electrolyte in order to enhance the oxygen ion conductivity of the electrolyte.

In the present disclosure gadolinium doped ceria (GDC) is selected as it shows 0.01 S/cm ionic conductivity at 800° C. operating temperature and it has a lower sintering temperature compared to zirconia based electrolyte. To reduce the sintering temperature and achieve higher density at lower temperature, different sintering aids having lower melting point are tried. It is found that $Bi_2O_3$ is a suitable candidate to incorporate. It has a melting temperature of about 827° C. and it shows good affinity for oxygen at a temperature above 600° C. Further, the present disclosure envisages a glass prepared by mixing bismuth oxide and potassium carbonate and optionally vanadium oxide and phosphorus pentoxide, which can be doped with gadolinium doped ceria in order to achieve the stable and highly conductive electrolyte. The glass composite is found to be more chemically stable than carbonate salts and ensures non-reactivity with ceramic matrix. The glass in the present disclosure is added in the GDC at different weight proportions and its effect on physical and chemical properties of the glass ceramic compound is studied. In the present disclosure glass and ceramic is chosen based on the crystal structure and lattice parameter matching with GDC. The composition of the glass is chosen such that there must be oxygen vacancies present per mole of glass. To achieve higher densification of electrolyte the glass must have lower melting temperature and should flow across the grain boundary to fill up voids present in pellet.

The ionic conductivity of the glass ceramic composite electrolyte in the temperature range of 400 to 600° C. ranges between $2.25 \times 10^{-5}$ and $3.53 \times 10^{-2}$ S/cm.

The sintering temperature of the glass ceramic composite electrolyte ranges between 900 and 1100° C.

In accordance with the present disclosure there is provided a fuel cell comprising an anode, a cathode and a glass ceramic composite electrolyte. The glass ceramic composite electrolyte of the present disclosure comprises gadolinium doped ceria and a glass consisting of bismuth oxide and potassium oxide; and optionally at least one of vanadium oxide and phosphorus pentoxide.

The present disclosure also provides a process for preparing the glass ceramic composite electrolyte; the process comprising the following steps: in the first step, cerium nitrate and gadolinium nitrate is mixed, and glycine is added in solid state to obtain a solution. The solution is stirred for 12 to 36 hours and then heated in the temperature range of 50 to 80° C. to obtain a gel. The gel so obtained is subjected to combustion in the temperature range of 200 to 300° C. to obtain a powdered mass, which is sintered in the temperature range of 700 to 900° C. for 3 to 6 hours to obtain gadolinium doped ceria having a particle size ranging from 20 to 80 nm.

In the second step, bismuth oxide and potassium carbonate; and optionally vanadium oxide and phosphorus pentoxide, are mixed and then acetone is added to obtain a mixture which is milled for 48 to 90 hours to obtain a milled mixture having a particle size ranging from 1 to 5 μm. After the completion of milling process, the milled mixture is dried to obtain a mass which is calcined in the temperature range of 700 to 1100° C. for 30 to 120 minutes to obtain a molten mass. The molten mass is quenched in water to obtain glass frit which is further milled to obtain fine glass powder.

In an embodiment of the present disclosure potassium carbonate is taken as a precursor for potassium oxide. Potassium has an ionic radius comparable with phosphorous and vanadium, and require higher activation energy for hopping compared to sodium and lithium. Other ions such as, sodium/lithium have an ionic radius much smaller than constituted ions in GDC and glass, which results in ion hopping at elevated temperatures. Use of potassium oxide hence, supports the ion exchange in the bismuth and gadolinium doped ceria matrix.

In another embodiment of the present disclosure, the proportion of vanadium oxide to phosphorus pentoxide in the glass composite is 1:1.

In the third step, the gadolinium doped ceria and the glass composite is grinded and poly vinyl alcohol is added and then grinded again to obtain a homogenized mass. The homogenized mass is pressed by applying pressure to obtain pressed pellets. These pressed pellets are sintered in the temperature range of 900 to 1100° C., ramp rate in the range of 5 to 15° C./min for 20 to 60 minutes to obtain the glass ceramic composite electrolyte.

Platinum paste can be applied to cross sectional surfaces of the glass ceramic composite electrolyte during electrodization to reduce ohmic resistance between testing sample and circuit electrodes.

The glass ceramic composite electrolyte of the present disclosure can operate at a lower temperature of 600° C. as compared to the conventional electrolytes which operates at a temperature of 800° C. and above. The glass ceramic composite electrolyte of the present disclosure shows an ionic conductivity of 0.01 S/cm. Hence, the glass ceramic composite electrolyte of the present disclosure requires lower activation energy as the warm-up period is reduced and there-by results in saving considerable amount of energy.

The present disclosure is further described in light of the following example which is set forth for illustration purpose only and not to be construed for limiting the scope of the disclosure.

Example 1

Preparing Gadolinium Doped Ceria

Gadolinium doped ceria was prepared by the glycine nitrate precursor method.

Cerium nitrate $[Ce(NO_3)_3.6H_2O]$ and gadolinium nitrate $[Gd(NO_3)_3.6H_2O]$ were mixed in an 8:2 molar proportion. Glycine in solid state was added to the above solution and stirred for 12 hours. The molar proportion of glycine was calculated to be 1.7 moles per metal nitrate in the solution. The solution was heated in an oven at 70° C. for gelation. The obtained gel was subjected to combustion at 250° C. and a pale yellow colored powdered mass was obtained, which was sintered at 800° C. for 4 hours to obtain the gadolinium doped ceria.

Preparation of Low Melting Temperature Glass

Bismuth oxide (80 wt %), vanadium oxide (7.5 wt %), phosphorus pentoxide (7.5 wt %) and potassium carbonate (5 wt %) were mixed to obtain a mixture and acetone was added to the mixture. The mixture containing bismuth oxide, vanadium oxide, phosphorus pentoxide, potassium carbonate and acetone was milled with zirconia balls for 72 hours and dried under infra-red lamp for 60 minutes to obtain a mass. The mass was calcined in an alumina crucible at 900° C. for 60 minutes to obtain a molten mass. The molten mass obtained was quenched in water to obtain dark yellow colored glass frit. The glass frit was milled to obtain finely powdered glass.

Preparation of Glass Ceramic Composite Electrolyte 40 wt % low melting temperature glass powder obtained in the above step was mixed with gadolinium doped ceria and grinded. 5 wt % polyvinyl alcohol was added to the grinded mixture and grinded again to obtain a homogenized mass. The homogenized mass was pelletized by applying pressure of 250 Mpa to obtain pressed pellets. The pressed pellets were sintered at 1000° C. at a ramp rate of 10° C./min for 40 minutes.

The density and shrinkage of the pellet were measured after sintering and is summarized in Table 1.

TABLE 1

Density and shrinkage of pellets after sintering at 1000° C. for 40 minutes

| Wt % of glass composite added in GDC | Density (gm/cm$^3$) | Shrinkage (%) |
|---|---|---|
| 10 | 5.2594 | 12.78 |
| 15 | 6.2066 | 12.44 |
| 20 | 5.9005 | 9.78 |
| 25 | 5.8201 | 8.67 |
| 30 | 5.7448 | 7.00 |
| 35 | 5.3270 | 3.89 |
| 40 | 5.3028 | 2.11 |

The shrinkage decreases as the amount of wt % of glass composite in GDC is increased.

Platinum paste was applied to the cross-sectional surfaces of the sintered pellet and the sintering process was repeated to obtain glass ceramic composite electrolyte composition.

The ionic conductivity of the prepared pellets was measured in the temperature range of 400 to 600° C. using impedance spectroscopy. The results are provided in Table 2.

Table 2 summarizes the ionic conductivity measured for the pellets at a temperature range of 400 to 600° C. using impedance spectroscopy.

TABLE 2

Ionic conductivity of pellets

| Wt % of glass composite added in GDC | Grain Conductivity | Grain Boundary Conductivity | Total Conductivity |
|---|---|---|---|
| 10 | 0.002 | 0.004 | 1.7 × 10$^{-3}$ |
| 15 | 0.006 | 0.004 | 2.6 × 10$^{-3}$ |
| 20 | 0.013 | 0.017 | 7.5 × 10$^{-3}$ |
| 25 | 0.024 | 0.018 | 1.0 × 10$^{-2}$ |
| 30 | 0.017 | 0.031 | 1.1 × 10$^{-2}$ |
| 35 | 0.028 | 0.034 | 1.5 × 10$^{-2}$ |
| 40 | 0.14 | 0.047 | 3.5 × 10$^{-2}$ |

The highest conductivity of 3.5×10$^{-2}$ was achieved at 40% of glass composite. The FRA curves of the different wt % of glass composite added to GDC is shown in FIG. 1 wherein A depicts 40% glass composite, B depicts 35% glass composite, C depicts 30% glass composite, D depicts 25% glass composite, E depicts 20% glass composite, F depicts 15% glass composite and G depicts 10% glass composite.

Figure 2:
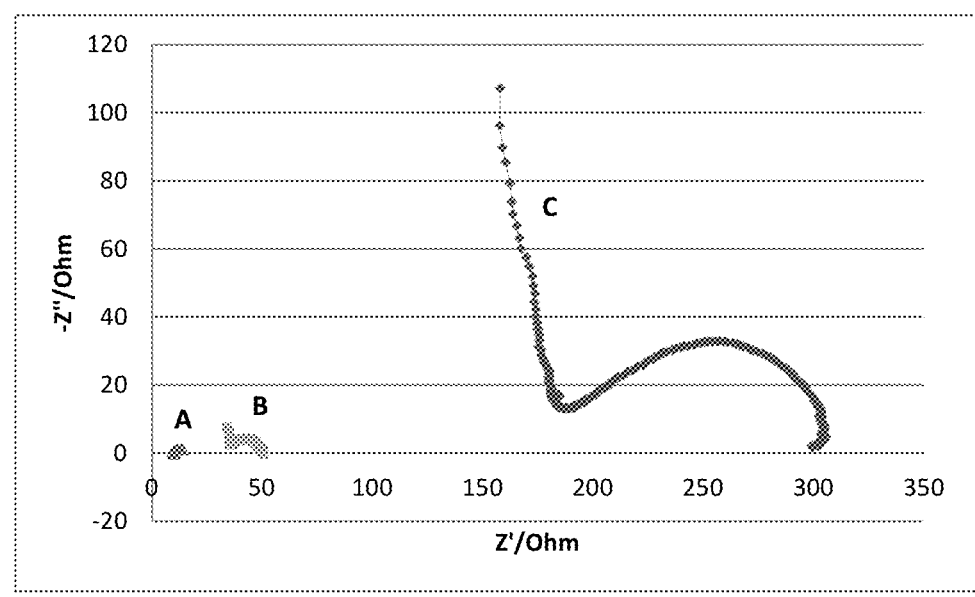
FIG. 2 illustrates the comparison of conductivity between pure gadolinium doped ceria (GDC), 2 wt % $Bi_2O_3$ added in GDC, 40 wt % glass composite added in GDC and the ionic conductivity measured at 600° C.

The ionic conductivity comparison between optimized GDC, 2 wt % $Bi_2O_3$ doped GDC and 40 wt % glass composite doped GDC at a temperature of 600° C. is shown in FIG. 2, wherein A depicts 40 wt % glass composite doped GDC, B depicts 2 wt % $Bi_2O_3$ doped GDC and C depicts optimized GDC.

TABLE 3

Comparison of ionic conductivity of pure GDC, GDC + 2 wt % crystalline $Bi_2O_3$ and GDC + 40 wt % glass-ceramic composite

| Sample | Ionic Conductivity |
|---|---|
| Pure GDC | 9.88 × 10$^{-3}$ |
| GDC + 2 wt % crystalline $Bi_2O_3$ | 4.68 × 10$^{-3}$ |
| GDC + 40 wt % glass ceramic composite | 3.5 × 10$^{-2}$ |

From the above Table 3 it is clear that an ionic conductivity of 0.03 S/cm is obtained when 40 wt % of glass ceramic composite is used with GDC.

To ensure that the observed conductivity is an ionic conductivity, the ionic transference number was measured at 600° C. for the glass ceramic composite electrolyte. The ionic transference number was observed to be close to 1 for all samples, as summarized in Table 4 below.

TABLE 4

Ionic transference number measured at 600° C.

| Sample | Ionic transference number measured at 600° C. |
|---|---|
| GDC + 10 wt % glass | 0.991 |
| GDC + 15 wt % glass | 0.991 |
| GDC + 20 wt % glass | 0.991 |
| GDC + 25 wt % glass | 0.991 |
| GDC + 30 wt % glass | 0.990 |
| GDC + 35 wt % glass | 0.985 |
| GDC + 40 wt % glass | 0.980 |

The ionic transference number is found to be decreasing with the increase in the amount of glass weight percent added, however, the ionic transference number remains close to 1.

Figure 3:
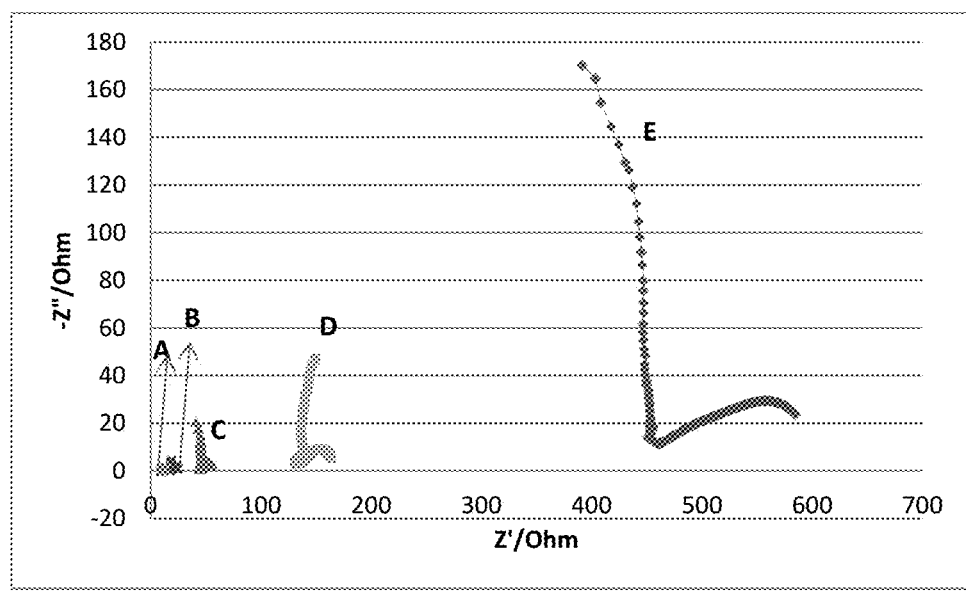
FIG. 3 illustrates the Frequency Response Analysis (FRA) curve measured for 40 wt % glass composite added GDC in the temperature range of 400-600° C.

The ionic conductivity of glass ceramic composite electrolyte comprising 40 wt % glass was measured in the temperature range of 400 to 600° C. The results are provided in Table 5. The FRA curve measured for 40 wt % glass added in GDC in the temperature range of 400 to 600° C. is shown in FIG. 3, wherein A depicts 600° C., B depicts 550° C., C depicts 500° C., D depicts 450° C. and E depicts 400° C.

Table 5 below summarizes the ionic conductivity of glass ceramic composite electrolyte comprising 40 wt % glass measured in the temperature range of 400 to 600° C.

TABLE 5

Ionic conductivity of GDC + 40 wt % glass measured in the temperature range of 400-600° C.

| Operating Temperature | Grain Conductivity | Grain Boundary Conductivity | Total Conductivity |
|---|---|---|---|
| 400 | $3.24 \times 10^{-5}$ | $7.35 \times 10^{-5}$ | $2.25 \times 10^{-5}$ |
| 450 | $1.01 \times 10^{-4}$ | $4.86 \times 10^{-4}$ | $1.03 \times 10^{-4}$ |
| 500 | $1.86 \times 10^{-4}$ | $1.01 \times 10^{-3}$ | $1.99 \times 10^{-4}$ |
| 550 | $6.41 \times 10^{-4}$ | $1.57 \times 10^{-3}$ | $5.64 \times 10^{-4}$ |
| 600 | $7.05 \times 10^{-3}$ | $2.82 \times 10^{-3}$ | $3.53 \times 10^{-2}$ |

Figure 4:
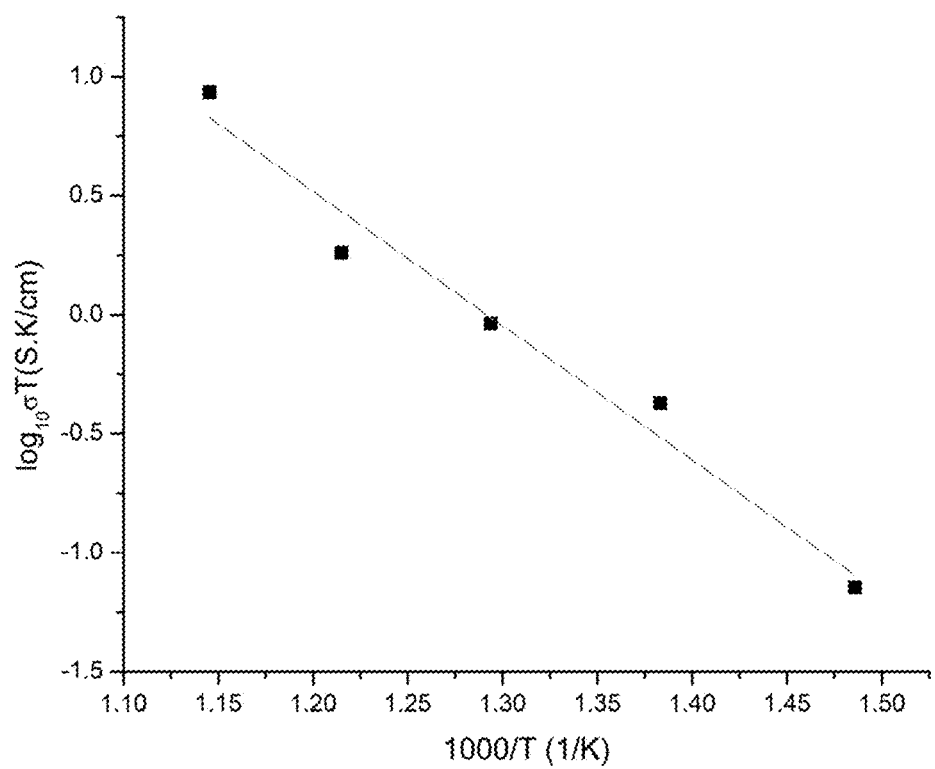
FIG. 4 illustrates the Arrhenius plot of 40 wt % glass composite added in GDC.

Ionic conductivity of GDC+40 wt % glass measured in the temperature range of 400 to 600° C. shows the maximum ionic conductivity of $3.53 \times 10^{-2}$ at 600° C. FIG. 4 shows the Arrhenius plot for AC conductivity of GDC+40 wt % glass measured in the temperature range of 400 to 600° C., the activation energy for 40 wt % glass in GDC is 0.453 eV.

Technical Advancements and Economical Significance

The technical advancements offered by the present disclosure include the realization of:

A glass ceramic composite electrolyte, comprising gadolinium doped ceria and glass powder, for use in low temperature solid oxide fuel cells.

A glass ceramic composite electrolyte, with ionic conductivity in the operating temperature range of 400 to 600° C.

A process for the preparation of glass ceramic composite electrolyte for low temperature solid oxide fuel cells.

The terminology used herein is for the purpose of describing particular example embodiments only and is not intended to be limiting. As used herein, the singular forms "a", "an" and "the" may be intended to include the plural forms as well, unless the context clearly indicates otherwise.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form part of the prior art base or were common general knowledge in the field relevant to the disclosure as it existed anywhere before the priority date of this application.

Wherever a range of values is specified, a value up to 10% below and above the lowest and highest numerical value respectively, of the specified range, is included in the scope of the disclosure.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A glass ceramic composite electrolyte comprising:
   a. gadolinium doped ceria; and
   b. a glass;
   wherein the glass ceramic composite electrolyte comprising a homogenized mixture of ground gadolinium doped ceria and ground glass powder, wherein the proportion of glass in the glass ceramic composite electrolyte varies between 10 and 40 wt %,
   wherein the glass comprises:
   a. 60 to 99 wt % bismuth oxide;
   b. 0 to 15 wt % vanadium oxide;
   c. 0 to 15 wt % phosphorus pentoxide; and
   d. 1 to 40 wt % potassium oxide.

2. The glass ceramic composite electrolyte as claimed in claim 1, wherein the glass consists of:
   a. 90 wt % bismuth oxide; and
   b. 10 wt % potassium oxide.

3. The glass ceramic composite electrolyte as claimed in claim 1 wherein the ratio of gadolinium doped ceria to glass in the glass ceramic composite electrolyte is 60:40.

4. The glass ceramic composite electrolyte as claimed in claim 1, wherein the ionic conductivity of said electrolyte in the temperature range of 400 to 600° C. ranges between $2.25 \times 10^{-5}$ and $3.53 \times 10^{-2}$ S/cm.

5. The glass ceramic composite electrolyte as claimed in claim 1, wherein the sintering temperature of said electrolyte ranges between 900 and 1100° C.

6. A fuel cell comprising:
   a. an anode;
   b. a cathode; and
   c. a glass ceramic composite electrolyte as claimed in claim 1.

7. A process for preparing glass ceramic composite electrolyte, said process comprising the following steps:
   I) mixing cerium nitrate and gadolinium nitrate to obtain a first mixture;
   II) adding glycine to said first mixture to obtain a solution;
   III) stirring said solution for a period of 12 to 36 hours followed by heating in the temperature range of 50 to 80° C. to obtain a gel;
   IV) subjecting said gel to combustion in the temperature range of 200 to 300° C. to obtain a powdered mass;
   V) sintering said powdered mass in the temperature range of 700 to 900° C. for a period ranging from 3 to 6 hours to obtain gadolinium doped ceria;
   VI) mixing bismuth oxide and potassium oxide and optionally vanadium oxide and phosphorus pentoxide, to obtain a second mixture;
   VII) adding acetone to said second mixture and milling said mixture for a period ranging from 48 to 90 hours to obtain a milled mixture;
   VIII) drying said milled mixture to obtain a dried mass;
   IX) calcinating said dried mass in the temperature range of 700 to 1100° C. for a period ranging from 30 to 120 minutes to obtain a molten mass;
   X) quenching said molten mass in water to obtain glass frit;
   XI) milling said glass frit to obtain glass powder;
   XII) adding said glass powder to gadolinium doped ceria and grinding to obtain a third mixture;
   XIII) adding polyvinyl alcohol to the third mixture and grinding to obtain a homogenized mass;
   XIV) subjecting said homogenized mass to pelletization by applying pressure in the range of 200-300 Mpa to obtain pressed pellets; and
   XV) sintering said pressed pellets in the temperature range of 900 to 1100° C., ramp rate in the range of 5 to 15° C./min for 20 to 60 minutes to obtain the glass ceramic composite electrolyte.

8. The process of claim 7, wherein the proportion of glass powder is 10 to 40 wt % of the total weight of the glass ceramic composite electrolyte.

9. The process of claim 7, wherein the molar proportion of cerium nitrate and gadolinium nitrate in the first mixture is 8:2.

10. The process of claim 7, wherein the percentage of bismuth oxide, vanadium oxide, phosphorus pentoxide and potassium oxide in the second mixture is in the range of 60 to 99 wt %; 0 to 15 wt %; 0 to 15 wt %; and 1 to 40 wt %, respectively.

* * * * *